US012750783B2

(12) United States Patent
Vikram et al.

(10) Patent No.: US 12,750,783 B2
(45) Date of Patent: Sep. 29, 2026

(54) ENHANCING USER EXPERIENCE IN LOW DATA USE CASE WITH WAKE UP SIGNAL ON

(71) Applicant: Apple Inc., Cupertino, CA (US)

(72) Inventors: Sushant Vikram, San Diego, CA (US); Ajay Singh, San Jose, CA (US); Gibran Ali, San Jose, CA (US)

(73) Assignee: Apple Inc., Cupertino, CA (US)

( * ) Notice: Subject to any disclaimer, the term of this patent is extended or adjusted under 35 U.S.C. 154(b) by 158 days.

(21) Appl. No.: 18/760,782

(22) Filed: Jul. 1, 2024

(65) Prior Publication Data

US 2025/0039796 A1 Jan. 30, 2025

Related U.S. Application Data

(60) Provisional application No. 63/529,412, filed on Jul. 28, 2023.

(51) Int. Cl.
*H04W 52/02* (2009.01)

(52) U.S. Cl.
CPC ............................... *H04W 52/0235* (2013.01)

(58) Field of Classification Search
CPC ......... H04W 52/0235; H04W 52/0216; H04W 52/0229; H04W 52/0209; Y02D 30/70; G06F 9/4418
See application file for complete search history.

(56) References Cited

U.S. PATENT DOCUMENTS

| | | | | | |
|---|---|---|---|---|---|
| 11,533,685 | B2 * | 12/2022 | Nam | H04W 68/00 | |
| 2019/0297577 | A1 * | 9/2019 | Lin | H04W 52/0235 | |
| 2021/0051589 | A1 * | 2/2021 | Nam | H04W 52/0216 | |
| 2021/0259044 | A1 * | 8/2021 | Islam | H04W 72/535 | |
| 2022/0039009 | A1 * | 2/2022 | Iyer | H04W 52/0219 | |
| 2022/0109488 | A1 * | 4/2022 | Nam | H04B 7/088 | |
| 2022/0256462 | A1 * | 8/2022 | Li | H04W 52/0232 | |
| 2022/0272568 | A1 * | 8/2022 | Lee | H04W 28/04 | |
| 2022/0295408 | A1 * | 9/2022 | Hosseini | H04W 52/0235 | |
| 2022/0369418 | A1 * | 11/2022 | Ma | H04W 76/28 | |
| 2023/0087310 | A1 * | 3/2023 | Guo | H04W 24/02 | 370/252 |
| 2023/0254771 | A1 * | 8/2023 | Shi | H04W 52/0274 | 370/318 |
| 2023/0262601 | A1 * | 8/2023 | Ganesan | H04W 52/0216 | 370/311 |

(Continued)

*Primary Examiner* — Ivan O Latorre

(74) *Attorney, Agent, or Firm* — Sterne, Kessler, Goldstein & Fox P.L.L.C.

(57) ABSTRACT

A user equipment (UE) having enhanced configured grant transmission is provided. The UE operates by determining whether a wake-up signal (WUS) indicator is received. The UE also determines whether a wake-up trigger condition is met, and based on a determination that the trigger condition is met, it determines whether the UE is configured with a power-save wake up (ps-WakeUp) parameter. Based on a determination that the UE is configured with the ps-WakeUp parameter, the UE determines whether the ps-WakeUp parameter is set to false. Further, based on a determination that the ps-WakeUp parameter is set to false, and based on a determination that the WUS indicator is not received, the UE transitions from a sleep state to an active state during a next discontinuous reception (DRX) on-duration period.

20 Claims, 6 Drawing Sheets

(56) References Cited

U.S. PATENT DOCUMENTS

| | | | | |
|---|---|---|---|---|
| 2023/0328652 | A1* | 10/2023 | Zhou | H04W 52/0229<br>370/318 |
| 2023/0397224 | A1* | 12/2023 | Lai | H04W 52/0229 |
| 2025/0039796 | A1* | 1/2025 | Vikram | H04W 52/0229 |
| 2026/0058854 | A1* | 2/2026 | Zhou | H04L 27/261 |
| 2026/0089798 | A1* | 3/2026 | Vikram | H04W 76/28 |

* cited by examiner

ENHANCING USER EXPERIENCE IN LOW DATA USE CASE WITH WAKE UP SIGNAL ON

CROSS REFERENCES

This application claims the benefit of U.S. Provisional Application No. 63/529,412 filed Jul. 28, 2023, titled "ENHANCING USER EXPERIENCE IN LOW DATA USE CASE WITH WAKE UP SIGNAL ON," the content of which is herein incorporated by reference in its entirety.

BACKGROUND

Field

The described aspects generally relate to techniques for reducing latency and power consumption in a wireless communication system.

Related Art

The 5G New Radio (NR) supports a wide range of use cases and applications with stringent latency and power consumption requirements. Connected mode discontinuous reception (DRX) is an essential technique for optimizing power consumption in 5G NR devices, particularly in bursty traffic scenarios where bursts of traffic are interspersed with idle periods.

SUMMARY

Some aspects of this disclosure relate to apparatuses and methods for enhancing user experience in low data use cases with wake-up signal (WUS) on. For example, some aspects of this disclosure relate to configuring a user equipment (UE) to wake up during a DRX on-duration when a power save wake-up (ps-WakeUp) parameter is set to false and a WUS indicator is not received.

Some aspects of this disclosure relate to a UE that has a transceiver configured to enable wireless communication with a base station, and a processor communicatively coupled to the transceiver. The processor is configured to determine whether a wake-up trigger condition is met. Based on a determination that the trigger condition is met, the UE determines whether a wake up signal (WUS) indicator is received. Also, the UE determines whether a wake-up trigger condition is met. Based on a determination that the trigger condition is met, the UE determines whether it is configured with a power-save wake up (ps-WakeUp) parameter. Next, based on a determination that the UE is configured with a ps-WakeUp parameter, the UE determines whether the ps-WakeUp parameter is set to false. Based on a determination that the ps-WakeUp parameter is set to false, and based on a determination that the WUS indicator is not received, the UE is configured to transition from a sleep state to an active state during a next discontinuous reception (DRX) on-duration period.

According to some aspects, based on a determination that the WUS indicator is received, and based on a determination that the WUS indicator is set to false, the processor is further configured to configure the UE to transition from a sleep state to an active state during the next DRX on-duration period. According to some aspects, based on a determination that the WUS indicator is not received, the processor is further configured to configure the UE to stay in the active state during the next DRX off-duration period. According to some aspects, based on a determination that the UE is not configured with a ps-WakeUp parameter, the processor is further configured to determine whether the WUS indicator is received. Next, based on a determination that the WUS indicator is not received, the UE is configured to transition from a sleep state to an active state during the next DRX on-duration period. Alternatively, based on a determination that the WUS indicator is received, and based on a determination that the WUS indicator is set to false, the processor is further configured to configure the UE to stay in the active state during the next DRX on-duration period.

According to some aspects, when the WUS indicator is received, the WUS indicator is received within a downlink control information (DCI) format 2_6 message. According to some aspects, the wake-up trigger condition is determined to be met when the UE is in the process of receiving real-time messaging traffic. According to some aspects, the wake-up trigger condition is determined to be met when the UE is in the process of performing a cell handover. According to some aspects, the wake-up trigger condition is determined to be met when the UE is in the process of performing a frequency division bandwidth part (BWP) switch. According to some aspects, the wake-up trigger condition is determined to be met when the UE is configured for high-speed train (HST) communications.

This Summary is provided merely for purposes of illustrating some aspects to provide an understanding of the subject matter described herein. Accordingly, the above-described features are merely examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

Figure 1:
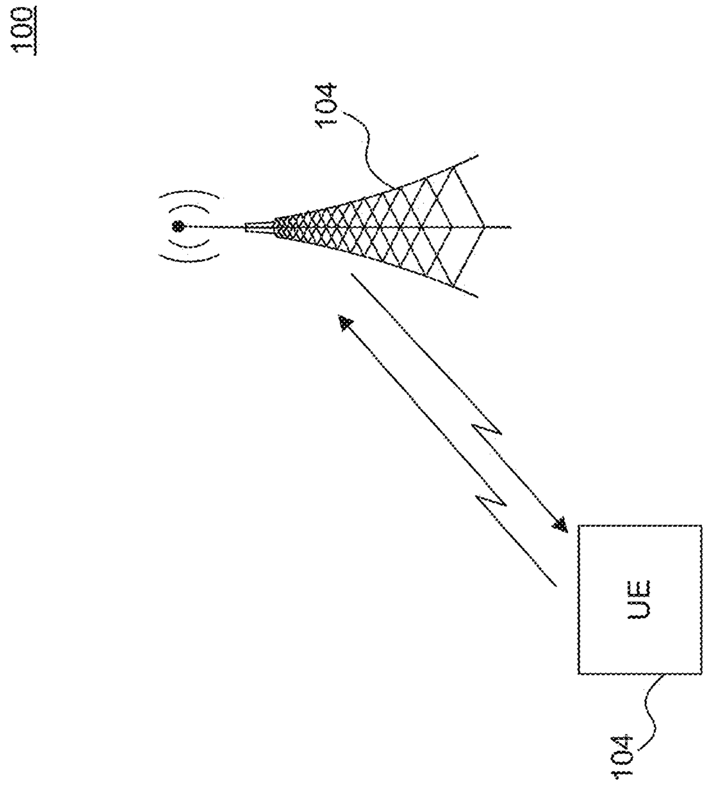
FIG. 1 illustrates an example wireless system implementing techniques for enhancing user experience in low data use cases with a wake-up signal (WUS) on, according to some aspects of the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Use case scenarios for 5G NR include enhanced mobile broadband (eMBB), ultra-reliable low-latency communications (URLLC), and massive machine-type communications (mMTC). These use cases cover a wide range of applications with highly diverse requirements. For example, eMBB is designed to cater to the large capacities needed to accommodate high user density scenarios. mMTC services are characterized by a massive number of sensors or connected devices which typically transmit low volume of non-delay sensitive data, and URLLC services refer to services that are expected to have exceptionally low latency and extremely high reliability.

Energy efficiency is a crucial aspect of 5G NR deployments on both the UE side and the network side. Reducing latency along with UE power consumption can contribute to enhanced user experience while extending UE battery life. In 5G NR, connected mode discontinuous reception (DRX) is an essential technique to reduce UE power consumption, particularly in bursty traffic scenarios where bursts of traffic are interspersed with idle periods. Connected mode DRX in 5G NR takes advantage of the idle periods by allowing the UE to turn off its receiver circuitry and enter a sleep state during off-durations where the UE is not required to monitor the physical downlink common control channel (PDCCH). However, the UE periodically wakes up during configured on-durations to monitor the PDCCH for possible resource allocation. Since monitoring PDCCH is a power-intensive operation, enabling UE to monitor PDCCH only during the configured DRX on-durations, instead of continuously monitoring the PDCCH, results in a significant reduction in UE power consumption.

Further reduction in UE power consumption can be achieved using wake-up signaling. The wake-up signal (WUS) feature was introduced in 3GPP release 16 as an enhancement to connected mode DRX. When no downlink data is expected for the UE, the network sends a WUS indicator that informs the UE to continue to sleep during a DRX on-duration, resulting in further energy savings at the UE. Similarly, when downlink data is expected for the UE, the WUS indicator informs the UE to wake up during a DRX on-duration.

However, in certain scenarios (e.g., during poor RF conditions), the UE may not detect the WUS, and failed detections of WUS may significantly degrade the quality of service provided to the user. For example, if the network schedules a downlink transmission during a DRX cycle, and the UE remains in sleep mode during the corresponding on-duration due to a failed detection of WUS, the UE may miss receiving the scheduled downlink data. This may result in subsequent retransmission of data, causing increased latency.

To address the above technological issues, embodiments herein provide techniques for enhancing user experience in a low data use case with a WUS on. Specifically, embodiments herein provide techniques to avoid potential degradation in user experience when a WUS is not successfully received. Some aspects of this disclosure relate to configuring the UE to transition from a sleep state to an active state during the next DRX on-duration period when a WUS indicator is not received, a wake-up trigger condition is met, and a power save wake-up (ps-WakeUp) parameter is set to false. Additionally, some aspects of the disclosure relate to precluding the UE from entering a sleep state as long as the wake-up trigger condition is satisfied when a WUS indicator is not received, a wake-up trigger condition is met, and the ps-WakeUp parameter is set to false.

FIG. 1 illustrates an example wireless system 100 implementing techniques for enhancing user experience in low data use case with WUS on, according to some aspects of the disclosure. The example wireless system 100 is provided for the purpose of illustration only and does not limit the disclosed aspects. Wireless system 100 may include, but is not limited to, a base station 104 and a user equipment (UE) 102.

According to some aspects, base station 104 can be a fixed station or a mobile station. Base station 104 may be referred to as a cellular Internet of Things (IoT) base station, an evolved NodeB (eNB), a next generation node B (gNB), a 5G node B (NB), or some other equivalent terminology. In some examples, base station 104 can be interconnected to one another and/or to other base stations or network nodes in a network through various types of backhaul interfaces such as a direct physical connection, a virtual network, and/or the like, not shown.

According to some aspects, UE 102 can be configured to operate based on a wide variety of wireless communication techniques. These techniques can include, but are not limited to, techniques based on 3rd Generation Partnership Project (3GPP) standards. UE 102 can be stationary or mobile. UE 102 can be a cellular phone (e.g., a smart phone), a personal digital assistant (PDA), a wireless modem, a wireless communication device, a handheld device, a laptop, a desktop, a cordless phone, a wireless local loop station, a wireless sensor, a tablet, a camera, a video surveillance camera, a gaming device, a netbook, an ultrabook, a medical device or equipment, a biometric sensor or device, a wearable device (smart watch, smart clothing, smart glasses, smart wrist band, smart jewelry such as smart ring or smart bracelet), an entertainment device (e.g., a music or video device, or a satellite radio), a vehicular component, a smart meter, an industrial manufacturing equipment, a global positioning system device, an Internet-of-Things (IoT) device, a machine-type communication (MTC) device, an evolved or enhanced machine-type communication (eMTC) device, or any other suitable device that is configured to communicate via a wireless medium. For example, a MTC and eMTC device can include a robot, a drone, a location tag, and/or the like. Furthermore, UE 102 can be an augmented reality device, a virtual reality device, a mixed reality device, or the like.

According to some aspects, UE 102 may be capable of communicating with one or more base stations of the wireless system 100. According to some aspects, wireless system 100 may utilize one or more radio access technologies (RATs) and may have overlapping coverage from one or more RATs. According to some aspects, the base station is an NR base station. An NR radio access network (RAN) includes NR base stations and a new radio core network (CN). An NR base station can be a next generation node B (gNB). UE 102 can access an external network via an NR base station and the NR CN.

The DRX operation is controlled by the parameters configured by radio resource control (RRC). BS 104 configures UE 102 with a set of connected mode DRX parameters. These parameters set durations of the DRX cycle, timers and on/off periods in milliseconds. According to some aspects, in response to a capability information enquiry for the network, UE 102 sends the network its capability information. The UE capability information may include 'drx-Adaption-r16' parameter. In response, the network may configure UE 102 with one or more of the following RRC parameters: RNTI value 'ps-RNTI-r16', power-save offset value 'ps-Offset-r16', the size of DCI format 2_6 'sizeDCI-2-6-r16', position of DCI format 2_6 'ps-PositionDCI-2-6-r16', and power save wake up parameter 'ps-WakeUp'.

Furthermore, the connected mode DRX parameters can be selected based on the application type such that power and resource savings are maximized. When DRX is enabled, UE 102's battery power consumption is reduced. However, this reduction in power consumption comes at the expense of increased latency. This is because, there might be an extended delay in receiving data as UE 102 may only be reachable when it is active according to the DRX cycle configured for it. Also, the latency increases with DRX cycle length, i.e., the longer the DRX cycle length, the higher the latency is. So, the DRX parameters must be carefully selected such that the packet delay is minimized and power saving is maximized.

Figure 2:
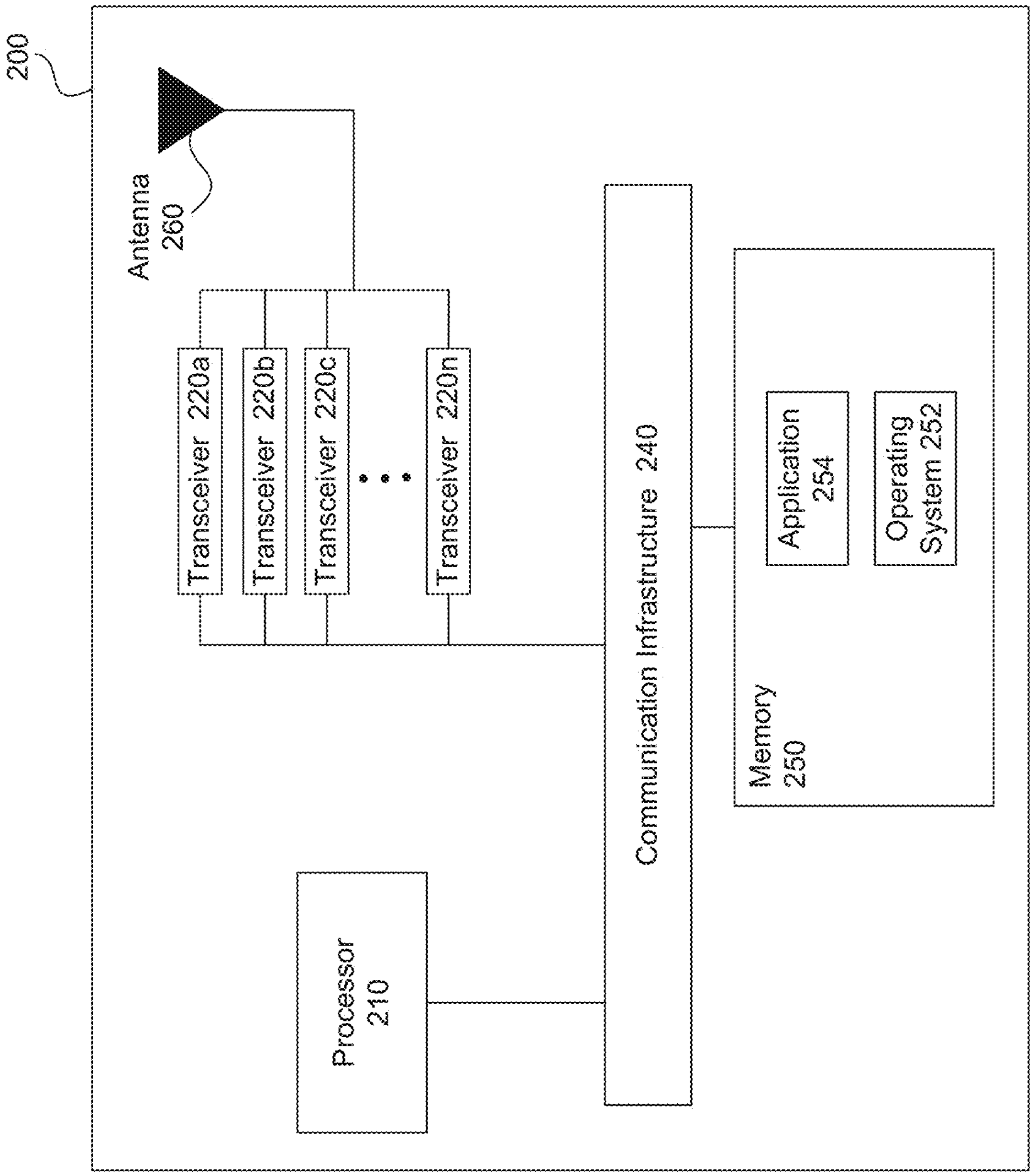
FIG. 2 illustrates a block diagram of an example system of an electronic device implementing techniques for enhancing user experience in low data use cases with a WUS on, according to some aspects of the disclosure.

FIG. 2 illustrates a block diagram of an example system 200 of an electronic device implementing techniques to enhance user experience in low data use case with a WUS on, according to some aspects of the disclosure. System 200 may be represent the base station 104 and/or UE 103 of system 100. System 200 includes processor 210, one or more transceivers 220*a*-220*n*, communication infrastructure 240, memory 250, operating system 252, application 254, and antenna 260. Illustrated systems are provided as exemplary parts of system 200, and system 200 can include other circuit(s) and subsystem(s). Also, although the systems of system 200 are illustrated as separate components, the aspects of this disclosure can include any combination of these, less, or more components.

Memory 250 may include random access memory (RAM) and/or cache, and may include control logic (e.g., computer software) and/or data. Memory 250 may include other storage devices or memory such as, but not limited to, a hard disk drive and/or a removable storage device/unit. According to some examples, operating system 252 can be stored in memory 250. Operating system 252 can manage transfer of data from memory 250 and/or one or more applications 254 to processor 210 and/or one or more transceivers 220*a*-220*n*. In some examples, operating system 252 maintains one or more network protocol stacks (e.g., Internet protocol stack, cellular protocol stack, and the like) that can include a number of logical layers. At corresponding layers of the protocol stack, operating system 252 includes control mechanism and data structures to perform the functions associated with that layer.

According to some examples, application 254 can be stored in memory 250. Application 254 can include applications (e.g., user applications) used by wireless system 200 and/or a user of wireless system 200. The applications in application 254 can include applications such as, but not limited to, radio streaming, video streaming, remote control, and/or other user applications.

System 200 can also include communication infrastructure 240. Communication infrastructure 240 provides communication between, for example, processor 210, one or more transceivers 220*a*-220*n*, and memory 250. In some implementations, communication infrastructure 240 may be a bus. Processor 210 together with computer instructions stored in memory 250 performs operations enabling system 200 of system 100 to implement techniques to enhance user experience in low data use case with a WUS on, according to some aspects of the disclosure, as described herein. Alternatively, processor 210 can be "hard-coded" to implement techniques to enhance user experience in low data use case with a WUS on, as described herein.

One or more transceivers 220*a*-220*n* transmit and receive communications signals that implement techniques to enhance user experience in low data use case with a WUS on, according to some aspects, and may be coupled to antenna 260. Antenna 260 may include one or more antennas that may be the same or different types. One or more transceivers 220*a*-220*n* allow system 200 to communicate with other devices that may be wired and/or wireless. In some examples, one or more transceivers 220*a*-220*n* can include processors, controllers, radios, sockets, plugs, amplifiers, filters, buffers, and like circuits/devices used for connecting to and communication on networks. According to some examples, one or more transceivers 220*a*-220*n* include one or more circuits to connect to and communicate on wired and/or wireless networks.

According to some aspects, one or more transceivers 220*a*-220*n* can include a cellular subsystem, a WLAN subsystem, and/or a Bluetooth™ subsystem, each including its own radio transceiver and protocol(s) as will be understood by those skilled arts based on the discussion provided herein. In some implementations, one or more transceivers 220*a*-220*n* can include more or fewer systems for communicating with other devices.

In some examples, one or more transceivers 220*a*-220*n* can include one or more circuits (including a WLAN transceiver) to enable connection(s) and communication over WLAN networks such as, but not limited to, networks based on standards described in IEEE 802.11. Additionally, or alternatively, one or more transceivers 220*a*-220*n* can include one or more circuits (including a Bluetooth™ transceiver) to enable connection(s) and communication based on, for example, Bluetooth™ protocol, the Bluetooth™ Low Energy protocol, or the Bluetooth™ Low Energy Long Range protocol. For example, transceiver 220*n* can include a Bluetooth™ transceiver.

Additionally, one or more transceivers 220*a*-220*n* can include one or more circuits (including a cellular transceiver) for connecting to and communicating on cellular networks such as 5G NR and the like. For example, one or more transceivers 220*a*-220*n* can be configured to operate according to one or more of Rel-15, Rel-16, Rel-17, or other of the 3GPP standards.

Figure 3:
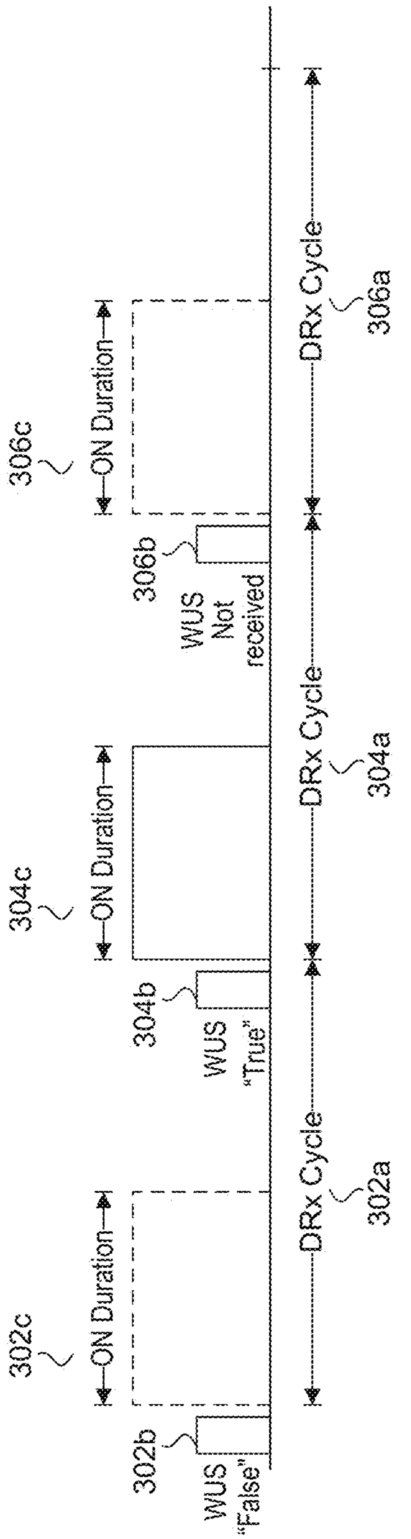
FIG. 3 illustrates an exemplary connected mode discontinuous reception (DRX) configuration 300, according to some aspects of this disclosure.

FIG. 3 illustrates an example connected mode DRX configuration 300, according to some aspects of this disclosure. The DRX configuration specifics a periodic repetition of on-duration followed by a possible period of inactivity. In the exemplary DRX configuration 300, each DRX cycle (e.g., 302*a*, 304*a*, and 306*a*) consists of an on-duration (e.g., 302*c*, 304*c*, and 306*c*) during which UE 102 enters an active state and monitors the PDCCH for possible downlink resource allocation. If UE 102 successfully detects PDCCH with downlink control information (DCI) indicating a new DL transmission, it stays in the active state and starts a DRX inactivity timer. UE 102 keeps monitoring PDCCH for the potential subsequent data scheduling until the DRX inactivity timer expires. However, if there is no data scheduled, UE 102 may turn off its RF circuitry (in the transceiver) and enter a sleep state. UE 102 then wakes up during periodically configured DRX on-durations to monitor the PDCCH.

When DRX is configured, UE 102 is not required to monitor PDCCH continuously. Since monitoring PDCCH is a power-intensive operation, enabling UE 102 to monitor PDCCH only during the configured DRX on-durations results in substantial power savings at UE 102. However, as UE 102 cannot know exactly when it may receive a downlink resource allocation, it monitors PDCCH during a DRX on-duration even when it has not been scheduled a transmission. This unnecessary PDCCH monitoring may consume a substantial amount of power.

Further improvements in power consumption can be achieved if the network tells UE 102 whether or not it should wake up and monitor PDCCH during an upcoming DRX on-duration. In 3GPP release 16, a wake-up signal (WUS) feature was introduced as an enhancement to DRX operation. When the WUS feature is configured, UE 102 wakes up at a configurable time (e.g., ps-offset time units) before the start of a long DRX cycle and checks for a WUS indicator. When UE 102 is expected to receive data, the WUS indicator is set to inform UE 102 to wake up during the on-duration of the next DRX cycle and monitor the PDCCH. However, when UE 102 is not expected to receive data during a DRX cycle, the WUS indicator is set to inform UE 102 to stay in a sleep state for the entirety of the DRX cycle, thereby minimizing unnecessary PDCCH monitoring.

According to some aspects, BS 104 conveys the WUS indicator to UE 102 using DCI format 2_6. However, other DCI formats or non-DCI communications can be used. The WUS indicator informs UE 102 whether or not to start the DRX on-duration timer for the next DRX cycle for potential data scheduling. According to some aspects, the WUS indicator set to true (e.g., WUS indicator is set to bit '1') informs UE 102 to start the DRX on-duration timer for the next long DRX cycle. Similarly, the WUS indicator set to false (e.g., WUS indicator is set to bit '0') informs UE 102 to not start the DRX on-duration timer for the next long DRX cycle. According to some aspects, the cyclic redundancy check (CRC) of DCI 2_6 is scrambled by a power save radio network temporary identifier (PS-RNTI) that corresponds to UE 102.

In the example of FIG. 3, UE 102 wakes up before the start of each DRX cycle (e.g., 302*a*, 304*a*, and 306*a*) and checks for the WUS indicator (e.g., 302*b*, 304*b*, and 306*b*). In an example, WUS indicator 302*b* is set to false, indicating that UE 102 is not expected to receive data during DRX cycle 302*a*. Hence, UE 102 does not start the DRX on-duration timer for DRX cycle 302*a*. Accordingly, UE 102 stays in sleep mode during on-duration 302*c* of DRX cycle 302*a*. In the example of FIG. 3, the next WUS indicator 304*b* is set to true, indicating that UE 102 is expected to receive data during DRX cycle 304*a*. Hence, UE 102 starts the DRX on-duration timer for DRX cycle 304*a*. Accordingly, UE 102 wakes up and stays in active mode during on-duration 304*c* of DRX cycle 304*a* and monitors the PDCCH.

Furthermore, in the example of FIG. 3, the WUS indicator 306*b* sent by BS 104 is not successfully detected by UE 102. According to some aspects, WUS indicator (e.g., in DCI format 2_6) may not be detected by UE 102 due to poor propagation conditions (e.g., reference signal received power (RSRP) and/or signal to interference plus noise ratio (SINR) are less that a threshold value). According to some aspects, UE 102 may not detect WUS indicator 306*b* when UE 102 and BS 104 are out of sync. According to some aspects, UE 102 may not detect WUS 306*b* when UE 102 is in a heavily loaded cell. According to some aspects, UE 102 may not detect WUS indicator 306*b* when UE 102 is in a mobility condition and misses a tracking area update. According to some aspects, UE 102 may not detect WUS indicator 306*b* when UE 102 is performing a BWP switch resulting in reconfiguration of connected mode DRX pattern. According to some aspects, UE 102 may not detect WUS indicator 306*b* when a change in traffic pattern results in the reconfiguration of DRX pattern. According to some aspects, UE 102 may not detect WUS 306*b* when a UE is in a high-speed mobility condition (e.g., HST scenario).

According to some aspects, when WUS indicator 306*b* is not detected, UE 102 may stay in sleep mode during on-duration 306*c* of DRX cycle 306*a*. Failed detection of DCI format 2_6 may result in a poor quality of service. For example, if the network schedules a downlink transmission during DRX 306*a*, and UE 102 stays in sleep mode during on-duration 306*c* due to failed decoding of DCI format 2_6, UE 102 may miss receiving the scheduled downlink data.

An optional power save wake-up parameter, ps-WakeUp (also referred to as ps-WakeUp-r16), was introduced in release-16. The ps-WakeUp parameter can be used to minimize degradation in user experience when UE 102 fails to detect WUS indicator 306*b*. According to some aspects, the ps-WakeUp parameter is sent by the BS as part of initial configuration. According to some aspects, when ps-WakeUp parameter is enabled (e.g., when ps-WakeUp parameter is set to 'true') and WUS indicator 306*b* is not detected, UE 102 wakes up during the on-duration of the DRX cycle. However, when the ps-WakeUp parameter is not configured or when the ps-WakeUp parameter is not enabled (e.g., when ps-WakeUp parameter is set to 'false'), UE 102 does not wake up during the on-duration of the DRX cycle when WUS indicator 306*b* is not detected.

In the example of FIG. 3, when ps-WakeUp parameter is enabled (e.g., ps-WakeUp parameter is set to 'true') and WUS indicator is not received (e.g., DCI 2_6 is not detected), UE 102 wakes up during the on-duration 306*c* of the DRX cycle 306*a*. However, when the optional ps-WakeUp parameter is not configured or when the ps-WakeUp parameter is not enabled (e.g., ps-WakeUp parameter is set to 'false'), and WUS 306*b* is not received (e.g., DCI 2_6 is not detected), UE 102 does not wake up during the on-duration 306*c* of the DRX cycle 306*a*. As mentioned earlier, UE 102 may miss receiving the scheduled downlink data as a result of not waking up during DRX cycle 306*a*. When UE 102 has been scheduled a transmission in the downlink that it cannot detect, the BS 104 retransmits the data at a later time, and this retransmission may result in increased delay. The degradation in user experience can be severe when the user is receiving latency-sensitive traffic.

For example, when a user is receiving latency-sensitive traffic (e.g., streaming video, and the like), a missed detection of the WUS may result in severe degradation of user experience (e.g., video stalling or video quality degradation). Other example scenarios where a missed detection of WUS may result in severe degradation of user experience include mobility scenarios where UE moves from one cell to another, UE switches its active bandwidth part (BWP), UE in a high-speed train scenario, UE configured with carrier aggregation, and the like.

Figure 4:
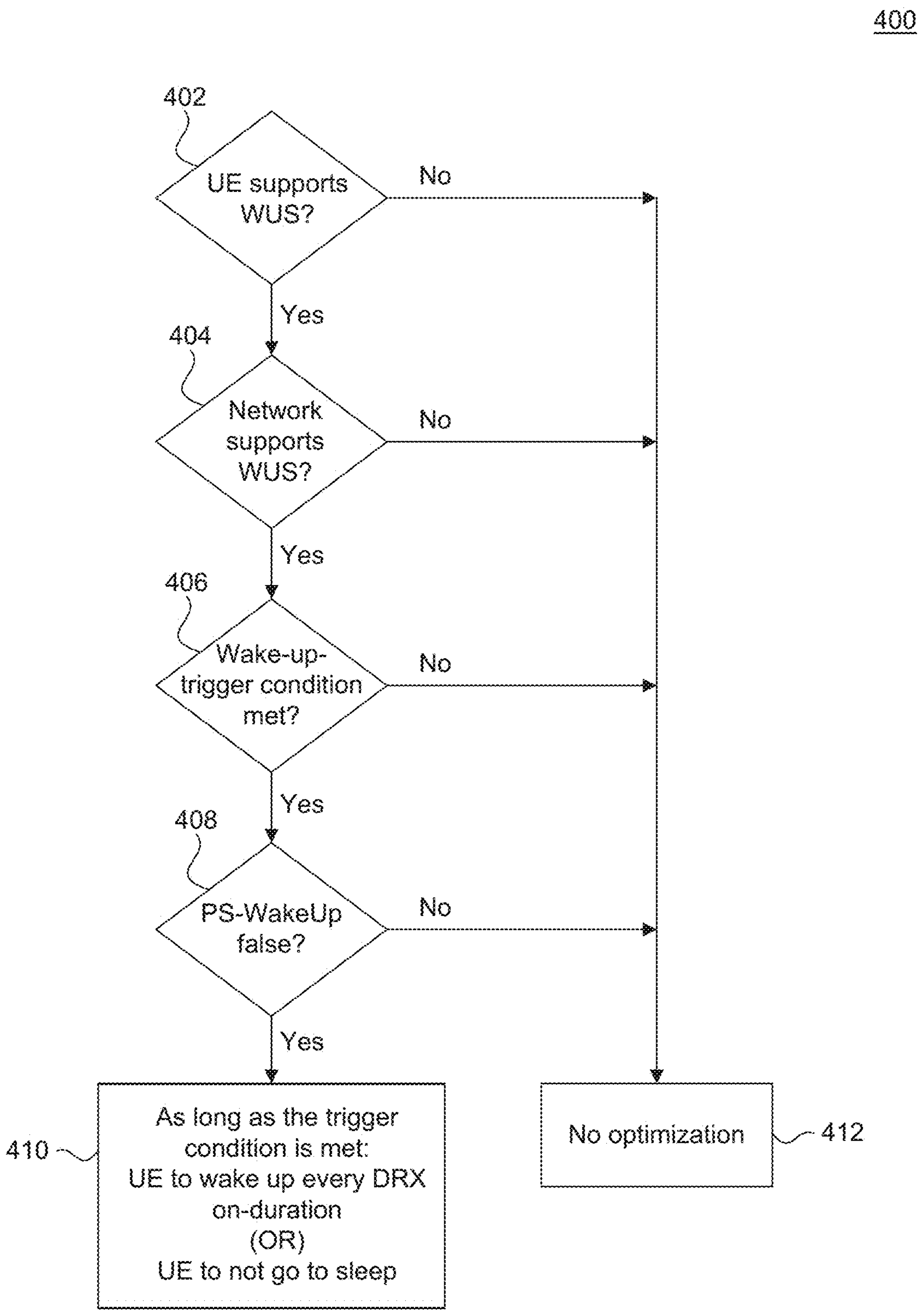
FIG. 4 illustrates an exemplary method to avoid potential degradation in user experience when a WUS is not successfully received, according to some aspects of this disclosure.

FIG. 4 illustrates an exemplary method 400 to avoid potential degradation in user experience when a WUS is not successfully received, according to some aspects of this disclosure. As a convenience and not a limitation, FIG. 4 may be described with regard to elements of FIGS. 1-3 and 6, for example, the functions of FIG. 4 may be performed by UE 102. For example, processor 210 can perform, or cause to perform, the functions of FIG. 5 in conjunction with other elements of FIG. 2. Method 400 may also be performed by system 200 of FIG. 2 and/or computer system 600 of FIG. 6. But method 400 is not limited to the specific aspects depicted in those figures, and other systems may be used to perform the method as will be understood by those skilled in the art. It is to be appreciated that not all operations may be needed, and the operations may not be performed in the same order as shown in FIG. 4.

At 402, a determination is made whether UE 102 supports WUS. According to some aspects, UE 102 sends the network its capability information. If UE 102 supports WUS, it may include a 'drx-Adaption-r16' parameter in the capability information it sends. According to some aspects, UE 102 may send its capability information in response to a capability enquiry from the network. If UE 102 does not support WUS, the example method 400 ends at 412. However, if UE 102 supports WUS, method 400 proceeds to 404.

At 404, a determination is made whether the network supports WUS. The WUS feature for the connected mode DRX was introduced in 3GPP release 16. As mentioned above, UE 102 sends the network its capability information, and the UE capability information may include 'drx-Adaption-r16' parameter. If the network supports WUS, it configures UE 102 with one or more of the following parameters: RNTI value 'ps-RNTI-r16', power-save offset value 'ps-Offset-r16', the size of DCI format 2_6 'sizeDCI-2-6-r16', the position of DCI format 2_6 'ps-PositionDCI-2-6-r16', and power save wake up parameter 'ps-WakeUp'. If the network does not support WUS, the example method 400 ends at 412. However, if the network supports WUS, method 400 proceeds to 406.

At 406, a determination is made whether a wake-up trigger condition is met. According to some aspects, a wake-up trigger condition is met if UE 102 finds itself in a scenario in which a missed detection of WUS may result in severe degradation of user experience. According to some aspects, the wake-up trigger condition is met when UE 102 receives a predetermined type of traffic. According to some aspects, the wake-up trigger condition is met if UE 102 receives latency-sensitive traffic (e.g., real-time video communications, streaming traffic, and the like). According to some aspects, the wake-up trigger condition is met if UE 102 is in a mobility scenario, such as a handover or redirection from one cell to another. According to some aspects, the wake-up trigger condition is met if UE 102 is in the process of switching its active bandwidth part (BWP). According to some aspects, the wake-up trigger condition is met if the network configures UE 102 with HST on SIB2. If the wake-up trigger condition is not met, the example method 400 ends. However, if the wake-up trigger condition is met, method 400 proceeds to 408.

At 408, a determination is made whether a ps-WakeUp parameter is set to false. According to some aspects, the network configures UE 102 with RRC parameters related to WUS. The RRC parameters include an indication of whether ps-wakeUp parameter is enabled or not (i.e., indicates whether the ps-WakeUp parameter is set to 'true' or 'false'). If the ps-wakeUp-r16 parameter is set to true, the example method 400 ends at 412. However, if the ps-WakeUp parameter is not enabled (i.e., the ps-WakeUp parameter is set to 'false'), method 400 proceeds to 410.

At 410, based on a determination that the wake-up trigger condition is met and the ps-wakeUp parameter is set to false, UE 102 is configured to wake up during a DRX on-duration as long as the wake-up trigger condition is satisfied, according to some aspects. Alternatively, based on a determination that the wake-up trigger condition is met and the ps-wakeUp parameter is set to false, UE 102 is precluded from entering a sleep state as long as the wake-up trigger condition is satisfied.

Figure 5:
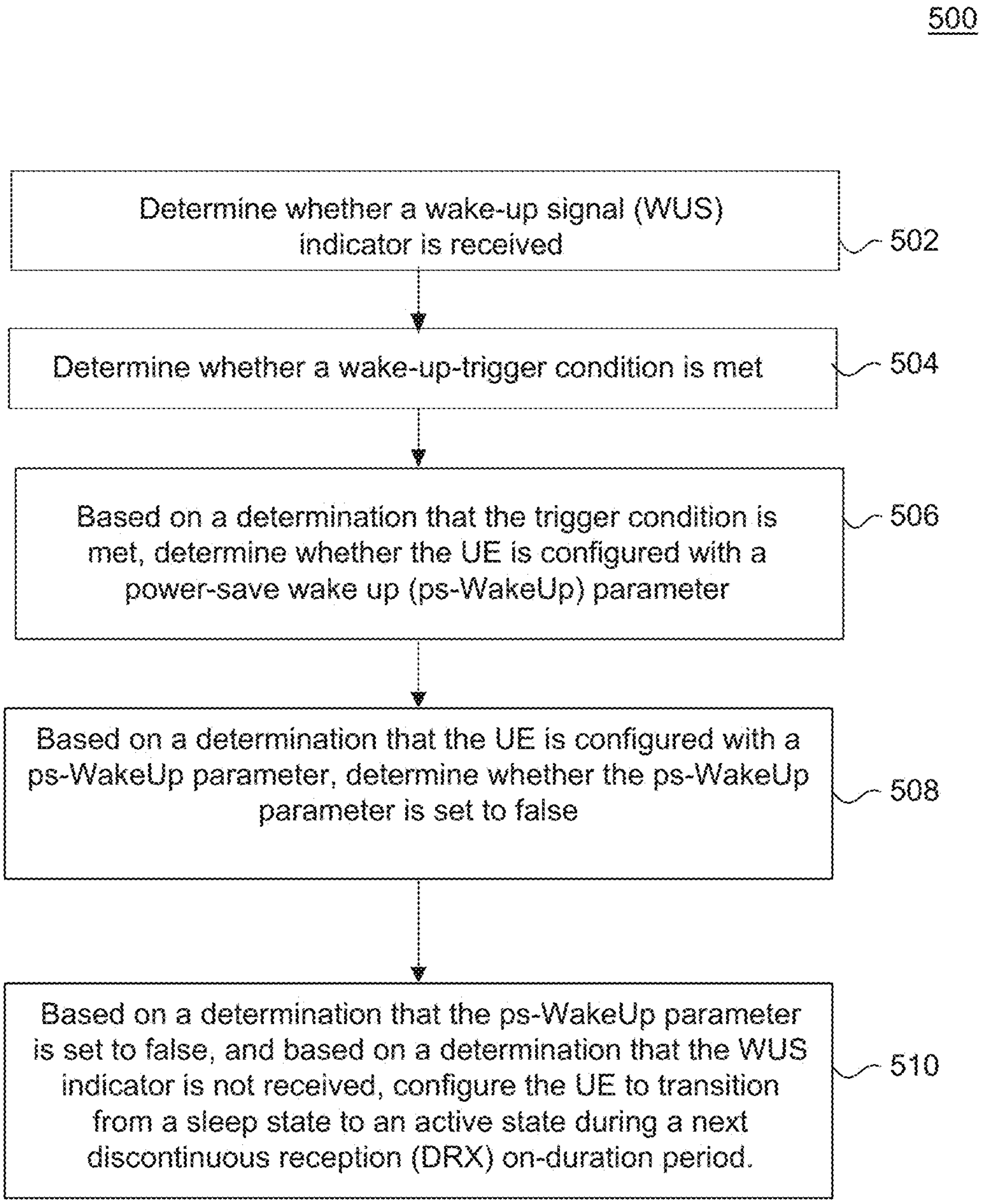
FIG. 5 illustrates an exemplary method performed by a UE for enhancing user experience in low data use cases with WUS on, according to some aspects of this disclosure.

FIG. 5 illustrates an exemplary method 500 performed by a UE for enhancing user experience in low data use case with wake-up signal on, according to some aspects of this disclosure. As a convenience and not a limitation, FIG. 5 may be described with regard to elements of FIGS. 1-4 and 6, for example, the functions of FIG. 5 can be performed by UE 102. For example, processor 210 can perform, or cause to perform, the functions of FIG. 5 in conjunction with other elements of FIG. 2. Method 500 can also be performed by system 200 of FIG. 2 and/or computer system 600 of FIG. 6. But method 500 is not limited to the specific aspects depicted in those figures, and other systems may be used to perform the method as will be understood by those skilled in the art. It is to be appreciated that not all operations may be needed, and the operations may not be performed in the same order as shown in FIG. 5.

At 502, UE 102 determines whether a wake-up signal (WUS) indicator is received. According to some aspects, UE 102 receives a WUS indicator within a DCI format 2_6 message. The WUS indicator informs UE 102 whether or not to start the DRX on-duration timer for the next DRX cycle for potential data scheduling. According to some aspects, the WUS indicator set to true (e.g., WUS indicator is set to bit '1') informs UE 102 to start the DRX on-duration timer for the next long DRX cycle. Similarly, the WUS indicator set to false (e.g., WUS indicator is set to bit '0') informs UE 102 to not start the DRX on-duration timer for the next long DRX cycle.

However, the WUS indicator (e.g., **306*b*) sent by BS 104 may not be successfully detected by UE 102. According to some aspects, UE 102 may not detect a WUS indicator (e.g., DCI format 2_6) due to poor RF channel conditions (e.g., reference signal received power (RSRP) and/or signal to interference plus noise ratio (SINR) are less than a threshold value). According to some aspects, UE 102 may not detect a WUS indicator when UE 102 and BS 104 are out of sync. According to some aspects, UE 102 may miss detecting WUS when UE 102 is in a heavily loaded cell. According to some aspects, UE 102 may miss detecting WUS when UE 102 is in a mobility condition and misses a tracking area update. According to some aspects, UE 102 may not detect a WUS when UE 102 is performing a BWP switch, resulting in the reconfiguration of connection mode DRX pattern. According to some aspects, UE 102 may miss detecting a WUS when a change in traffic pattern results in reconfiguration of DRX pattern. According to some aspects, UE 102** may miss detecting a WUS when a UE is in a high-speed mobility condition (e.g., HST scenario).

At 504, UE 102 determines whether a wake-up condition is met. According to some aspects, the UE determines that a wake-up trigger condition is met if it receives a predetermined type of latency-sensitive traffic (e.g., real-time video communications, streaming traffic, and the like). According to some aspects, UE 102 determines that a wake-up trigger condition is met if UE 102 receives a predetermined type of latency sensitive traffic for at least a threshold amount of time. According to some aspects, UE 102 determines that the wake-up trigger condition is met if UE 102 is in a mobility scenario, such as a handover or redirection from one cell to another. According to some aspects, the UE 102 determines that the wake-up trigger condition is met if it is in the process of performing a frequency division BWP switch. According to some aspects, UE 102 determines that the wake-up trigger condition is met if the network configures UE 102 with HST on SIB2. According to some aspects, UE 102 determines that a wake-up trigger condition is met if it is in a HST scenario for at least a threshold amount of time. According to some aspects, the threshold amount of time is a parameter configured by the network.

At 506, based on a determination that the trigger condition is met, the UE 102 determines whether it is configured with a power save wake up (ps-WakeUp) parameter. According to some aspects, the network may configure UE 102 with a set of DRX-related RRC parameters that include the ps-WakeUp parameter. According to some aspects, the configured ps-WakeUp parameter may be set as either true or false. When the ps-WakeUp parameter is set to true, UE 102 may start an associated drx-onDurationTimer in case a WUS indicator (e.g., DCI format 2_6) is monitored but not detected. Alternatively, since the ps-WakeUp parameter is an optional parameter, the network may not configure UE 102 with a ps-WakeUp parameter, according to some aspects.

At 508, based on a determination that UE 102 is configured with a ps-WakeUp parameter, UE 102 determines whether the ps-WakeUp parameter is set to false. If the ps-WakeUp parameter is not set to false, the example method 500 ends. However, if the ps-WakeUp parameter is set to false, method 500 proceeds to 510.

At 510, based on a determination that the ps-WakeUp parameter is set to false, and based on a determination that the WUS indicator is not received, UE 102 transitions from a sleep state to an active state during the next discontinuous reception (DRX) on-duration period. According to some aspects, based on a determination that the WUS indicator is received, and based on a determination that the WUS indicator is set to false, UE 102 can be configured to transition from a sleep state to an active state during the next DRX on-duration period.

Furthermore, based on a determination that the WUS indicator is not received, UE 102 stays in the active state during the next DRX off-duration period. According to some aspects, based on a determination that the ps-WakeUp parameter is set to false and the WUS indicator is not received, UE 102 can be configured to not enter a sleep state as long as the wake-up trigger condition is satisfied. According to some aspects, based on a determination that the UE 102 is not configured with a ps-WakeUp parameter, UE 102 determines whether a WUS indicator is received. Based on a determination that the WUS indicator is not received, UE is configured to transition from a sleep state to an active state during the next DRX on-duration period. According to some aspects, based on a determination that the WUS indicator is received, and based on a determination that the WUS indicator is set to false, UE 102 can be configured to stay in the active state during the next DRX on-duration period.

Figure 6:
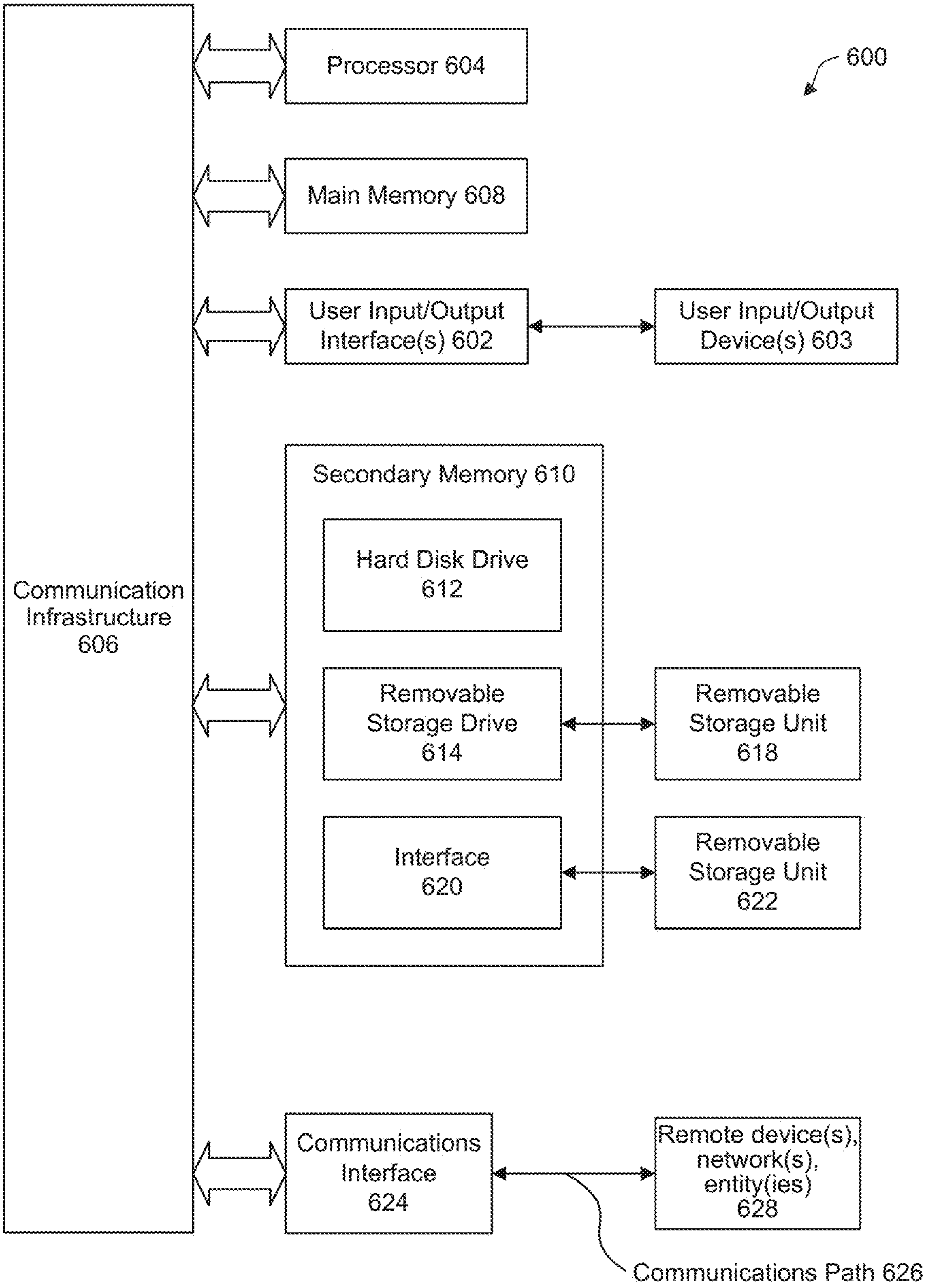
FIG. 6 is an example computer system for implementing some aspects or portion(s) thereof.

Various aspects can be implemented, for example, using one or more computer systems, such as computer system 600 shown in FIG. 6. Computer system 600 can be any well-known computer capable of performing the functions described herein such as UE 102 of FIG. 1. Computer system 600 includes one or more processors (also called central processing units, or CPUs), such as a processor 604. Processor 604 is connected to a communication infrastructure 606 (e.g., a bus). Computer system 600 also includes user input/output device(s) 603, such as monitors, keyboards, pointing devices, etc., that communicate with communication infrastructure 606 through user input/output interface(s) 602. Computer system 600 also includes a main or primary memory 606, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "aspects" "an example," "examples," or similar phrases, indicate that the aspect(s) described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

What is claimed is:

1. A user equipment (UE), comprising:
- a transceiver configured to enable wireless communication; and
- a processor communicatively coupled to the transceiver and configured to:
  - determine whether a wake up signal (WUS) indicator is received;
  - determine whether a wake-up trigger condition is met;
  - based on a determination that the wake-up trigger condition is met, determine whether the UE is configured with a power-save wake up (ps-WakeUp) parameter;
  - based on a determination that the UE is configured with the ps-WakeUp parameter, determine whether the ps-WakeUp parameter is set to false; and
  - based on a determination that the ps-WakeUp parameter is set to false, and based on a determination that the WUS indicator is not received, configure the UE to transition from a sleep state to an active state during a next discontinuous reception (DRX) on-duration period.

2. The UE of claim 1, wherein, based on a determination that the WUS indicator is received, and based on a determination that the WUS indicator is set to false, the processor is further configured to:
- configure the UE to transition from the sleep state to the active state during the next DRX on-duration period.

3. The UE of claim 1, wherein, based on the determination that the WUS indicator is not received, the processor is further configured to:
- configure the UE to stay in the active state during the next DRX off-duration period.

4. The UE of claim 1, wherein, based on a determination that the UE is not configured with the ps-WakeUp parameter, the processor is further configured to:
- based on the determination that the WUS indicator is not received, configure the UE to transition from the sleep state to the active state during the next DRX on-duration period.

5. The UE of claim 4, wherein, based on a determination that the WUS indicator is received, and based on a determination that the WUS indicator is set to false, the processor is further configured to:
- configure the UE to stay in the active state during the next DRX on-duration period.

6. The UE of claim 1, wherein when the WUS indicator is received, the WUS indicator is received within downlink control information (DCI) format 2_6.

7. The UE of claim 1, wherein the wake-up trigger condition is determined to be met when the UE is in a process of receiving real-time messaging traffic.

8. The UE of claim 1, wherein the wake-up trigger condition is determined to be met when the UE is in a process of performing a cell handover.

9. The UE of claim 1, wherein the wake-up trigger condition is determined to be met when the UE is in a process of performing a frequency division bandwidth part (BWP) switch.

10. The UE of claim 1, wherein the wake-up trigger condition is determined to be met when the UE is configured for high speed train (HST) communications.

11. A method of operating a user equipment (UE), comprising:

determining whether a wake up signal (WUS) indicator is received;

determining whether a trigger condition is met;

based on a determination that the trigger condition is met, determining whether the UE is configured with a power save wake up (ps-WakeUp) parameter;

based on a determination that the UE is configured with the ps-WakeUp parameter, determine whether the ps-WakeUp parameter is set to false; and based on a determination that the ps-WakeUp parameter is set to false, and based on a determination that the WUS indicator is not received, configuring the UE to transition from a sleep state to an active state during a next discontinuous reception (DRX) on-duration period.

12. The method of claim 11, further comprising:

based on a determination that the WUS indicator is received, and based on a determination that the WUS indicator is set to false, configuring the UE to transition from the sleep state to the active state during the next DRX on-duration period.

13. The method of claim 11, further comprising:

based on a determination that the WUS indicator is not received, configuring the UE to stay in the active state during the next DRX off-duration period.

14. The method of claim 11, based on a determination that the UE is not configured with the ps-WakeUp parameter, further comprising:

based on the determination that the WUS indicator is not received, configuring the UE to transition from the sleep state to the active state during the next DRX on-duration period.

15. The method of claim 14, further comprising:

based on a determination that the WUS indicator is received, and based on a determination that the WUS indicator is set to false, configuring the UE to stay in the active state during the next DRX off-duration period.

16. A non-transitory computer-readable medium (CRM) having instructions stored thereon that, when executed by a processor of a user equipment (UE), causes the UE to perform operations comprising:

determining whether a wake up signal (WUS) indicator is received;

determining whether a trigger condition is met;

based on a determination that the trigger condition is met, determining whether the UE is configured with a power save wake up (ps-WakeUp) parameter;

based on a determination that the UE is configured with the ps-WakeUp parameter, determine whether the ps-WakeUp parameter is set to false; and based on a determination that the ps-WakeUp parameter is set to false, and based on a determination that the WUS indicator is not received, configuring the UE to transition from a sleep state to an active state during a next discontinuous reception (DRX) on-duration period.

17. The non-transitory CRM of claim 16, the operations further comprising:

based on a determination that the WUS indicator is received, and based on a determination that the WUS indicator is set to false, configuring the UE to transition from the sleep state to the active state during the next DRX on-duration period.

18. The non-transitory CRM of claim 16, the operations further comprising:

based on a determination that the WUS indicator is not received, configuring the UE to stay in the active state during the next DRX off-duration period.

19. The non-transitory CRM of claim 16, based on a determination that the UE is not configured with the ps-WakeUp parameter, the operations further comprising:

based on a determination that the WUS indicator is not received, configuring the UE to transition from the sleep state to the active state during the next DRX on-duration period.

20. The non-transitory CRM of claim 19, the operations further comprising:

based on a determination that the WUS indicator is received, and based on a determination that the WUS indicator is set to false, configuring the UE to stay in the active state during the next DRX off-duration period.

* * * * *